(12) United States Patent
Venkataramana et al.

(10) Patent No.: US 10,554,643 B2
(45) Date of Patent: Feb. 4, 2020

(54) METHOD AND SYSTEM TO PROVIDE ADDITIONAL SECURITY MECHANISM FOR PACKAGED WEB APPLICATIONS

(71) Applicant: Samsung Electronics Co., Ltd., Gyeonggi-do (KR)

(72) Inventors: Balaji Nerella Venkataramana, Bangalore (IN); Kaushik Das, Bangalore (IN); Satish Nanjunda Swamy Jamadagni, Bangalore (IN); Prabhavathi Perumal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/578,090

(22) Filed: Dec. 19, 2014

(65) Prior Publication Data
US 2015/0180850 A1   Jun. 25, 2015

(30) Foreign Application Priority Data

Dec. 20, 2013 (IN) ............................. 5960CHE/2013
Aug. 4, 2014 (IN) ............................. 5960/CHE/2013

(51) Int. Cl.
*H04L 29/06* (2006.01)
(52) U.S. Cl.
CPC .................................. *H04L 63/08* (2013.01)
(58) Field of Classification Search
None
See application file for complete search history.

(56) References Cited

U.S. PATENT DOCUMENTS

| | | | | |
|---|---|---|---|---|
| 6,604,143 B1* | 8/2003 | Nagar | ................. | H04L 63/0227 709/229 |
| 8,005,983 B2* | 8/2011 | Hopen | ................ | G06F 21/6218 709/238 |
| 8,700,729 B2* | 4/2014 | Dua | ........................ | G06Q 20/20 709/217 |
| 8,782,411 B2* | 7/2014 | Nimashakavi | ........ | H04L 9/3213 713/168 |
| 8,806,595 B2* | 8/2014 | Nimashakavi | ........ | G06F 21/335 726/6 |

(Continued)

OTHER PUBLICATIONS

NPL Search (Google Scholar) (Year: 2019).*

*Primary Examiner* — Mahfuzur Rahman
*Assistant Examiner* — Richard W Cruz-Franqui

(57) ABSTRACT

A method for authenticating a client application by an authorization server is provided. In the method, the authorization server transmits a first redirect identifier assigned to a client application to a web runtime engine, in response to receiving a registering request to register with the authorization server of the client application; receives an access request to access a protected resource stored on a resource server by the client application: and transmits the access request to the resource server through the web runtime engine using a second redirect identifier corresponding to a redirect endpoint of the client application. The second redirect identifier is intercepted by the web runtime engine, and the protected resource is accessed by the client application based on a comparing result between the first redirect identifier and the second redirect identifier in the web runtime engine.

16 Claims, 7 Drawing Sheets

(56) References Cited

U.S. PATENT DOCUMENTS

| | | | |
|---|---|---|---|
| 8,832,814 B2* | 9/2014 | Coletta | H04L 63/00 705/35 |
| 8,868,915 B2* | 10/2014 | Counterman | G06F 21/335 713/176 |
| 8,925,050 B2* | 12/2014 | Balakrishnan | H04L 63/083 726/5 |
| 8,935,757 B2* | 1/2015 | Srinivasan | H04L 63/10 726/4 |
| 9,009,787 B2* | 4/2015 | Nimashakavi | H04L 63/10 726/2 |
| 9,038,142 B2* | 5/2015 | Vongsouvanh | H04L 63/0492 726/4 |
| 9,104,848 B2* | 8/2015 | Banatwala | G06F 21/31 |
| 9,118,653 B2* | 8/2015 | Nimashakavi | G06F 21/335 |
| 9,148,548 B2* | 9/2015 | Nuggehalli | H04L 63/083 |
| 9,160,731 B2* | 10/2015 | Chang | H04L 63/08 |
| 9,165,134 B2* | 10/2015 | Lorenzo | G06F 21/41 |
| 9,197,623 B2* | 11/2015 | Srinivasan | H04L 63/08 |
| 9,201,634 B2* | 12/2015 | Shah | G06F 8/38 |
| 9,225,532 B2* | 12/2015 | Counterman | H04L 9/3271 |
| 9,300,746 B2* | 3/2016 | Akuzawa | G06F 9/4401 |
| 9,497,180 B2* | 11/2016 | Oyman | H04L 63/10 |
| 2002/0138660 A1* | 9/2002 | Eilers | G06F 9/5055 719/313 |
| 2004/0172627 A1* | 9/2004 | Ramani | G06F 8/36 717/162 |
| 2007/0088611 A1* | 4/2007 | Christiansen | G06Q 20/20 705/16 |
| 2007/0180225 A1* | 8/2007 | Schmidt | H04L 9/321 713/152 |
| 2008/0114678 A1* | 5/2008 | Bennett | G06Q 20/04 705/44 |
| 2008/0275888 A1* | 11/2008 | Shuster | H04L 29/06047 |
| 2009/0328142 A1* | 12/2009 | Wang | H04L 9/3247 726/2 |
| 2009/0328208 A1* | 12/2009 | Peters | G06F 21/51 726/22 |
| 2010/0050243 A1* | 2/2010 | Hardt | H04L 63/0823 726/6 |
| 2010/0083347 A1* | 4/2010 | Hinton | H04L 9/3268 726/1 |
| 2011/0277026 A1* | 11/2011 | Agarwal | G06F 21/41 726/8 |
| 2012/0260321 A1* | 10/2012 | Wendt | H04L 9/0863 726/5 |
| 2012/0304160 A1* | 11/2012 | Soeder | G06F 9/4486 717/148 |
| 2013/0167196 A1* | 6/2013 | Spencer | H04W 8/22 726/3 |
| 2014/0033278 A1* | 1/2014 | Nimashakavi | G06F 21/335 726/4 |
| 2014/0033279 A1* | 1/2014 | Nimashakavi | H04L 63/0807 726/4 |
| 2014/0033280 A1* | 1/2014 | Nimashakavi | H04L 63/0807 726/4 |
| 2014/0230020 A1* | 8/2014 | Mogaki | H04L 63/10 726/4 |
| 2014/0245417 A1* | 8/2014 | Hu | H04L 63/0807 726/7 |
| 2014/0282919 A1* | 9/2014 | Mason | H04L 63/0807 726/4 |
| 2014/0331287 A1* | 11/2014 | Barr | H04L 9/3268 |
| 2014/0359098 A1* | 12/2014 | Xu | H04L 67/10 709/223 |
| 2014/0380428 A1* | 12/2014 | Kobayashi | G06F 21/335 726/4 |
| 2014/0380429 A1* | 12/2014 | Matsugashita | H04L 63/0823 726/4 |
| 2015/0082398 A1* | 3/2015 | Balakrishnan | G06F 21/31 726/5 |
| 2015/0089623 A1* | 3/2015 | Sondhi | H04L 63/08 726/9 |
| 2015/0145647 A1* | 5/2015 | Engel-Dahan | G07C 9/00571 340/5.61 |
| 2015/0180850 A1* | 6/2015 | Venkataramana | H04L 63/08 726/4 |
| 2016/0044023 A1* | 2/2016 | Barr | H04L 63/0823 726/1 |
| 2016/0164685 A1* | 6/2016 | Ashley | H04L 63/0823 713/175 |
| 2017/0026186 A1* | 1/2017 | Gu | H04L 9/3265 |

* cited by examiner

METHOD AND SYSTEM TO PROVIDE ADDITIONAL SECURITY MECHANISM FOR PACKAGED WEB APPLICATIONS

CROSS-REFERENCE TO RELATED APPLICATION AND CLAIM OF PRIORITY

The present application is related to and claims priority from an Indian Application Number 5960/CHE/2013 filed on Dec. 20, 2013 and Indian Application Number 5960/CHE/2013 filed on Aug. 4, 2014, the disclosures of which are hereby incorporated by reference herein.

TECHNICAL FIELD

The present disclosure generally relates to web applications and more particularly to a method and system to provide an additional level of security mechanism for packaged web applications.

BACKGROUND

OAuth (Open Authorization) is an open standard for authorization. When certain applications (client applications) accesses users' (i.e. resource owner) protected resources (e.g., photos, videos, contact lists), which are owned by another application (i.e. resource server) a double authentication is required. The client application and the resource owner need to be authenticated by the resource server before allowing any access to the protected resources. The OAuth enables resource owners to provide specific and time bound rights to access the protected resources to the client applications without having to hand out their credentials, typically username and password. The OAuth is based on three-party trust federation: client application, resource server and resource owner.

The OAuth allows resource owners to grant rights to access their information to a third party client application, which the user cannot trust entirely. The information being accessed is typically stored with another resource server. This access grant is provided as a result of the client application initiating an authorization-flow. The authorization flow is initiated to an authorization-endpoint (also known as authorization server, a component of resource server that handles the authorization flow). Prior to the authorization-flow initiation the authorization server mandates the client application to register with itself. During the process of registration a client identifier (ID) is assigned to the client application. Upon completion of the authorization flow, the client applications are issued a time-bound access-token instead of the protected data being exposed to the full extent. Each access-token grants access to a specific site (e.g., a video editing site), to a specific resources (e.g., just videos from a specific album), and to specific time duration (e.g., the next 2 hours). Upon initiation of the authorization flow, the authorization end-point gets the control. Upon completion of authorization flow, the authorization end point returns the control back to the client application by means of the redirect-endpoint.

The OAuth is defined only for Hyper Text Transfer Protocol (HTTP) Transport. The authorization-endpoint, redirect-endpoint should be valid HTTP URIs. As the OAuth requires redirect endpoints to be the HTTP URIs, packaged web applications cannot get the control back from authorization page, as they do not have HTTP end point. And therefore, as they cannot get the control back from the authorization page, the packaged web applications cannot use the OAuth mechanism in the usual way.

For the packaged web applications to use the OAuth, they need support from a web runtime engine. The web runtime engine can capture the redirect end point and instead of redirecting the web page associated with the URI it would notify the packaged web application with the captured redirect end point. However, this mechanism opens up the possibility of session fixation type of attacks. A malicious packaged web application can use the credentials and redirect end points of another genuine application and dupe the resource owner. In other traditional methods, even if the authorization server uses a transport layer security during authorization flow, the client ID and the redirect URI can be seen from some other network sniffer tools and http referrer headers. Once the client ID and the redirect URI of another application is known, an attacker can package a new application using the credentials and misuse the access to the protected resource.

Thus, there is a need of robust method and system to add an additional of security mechanism for the packaged web applications to ensure that the redirect endpoint is not that of another application.

The above information is presented as background information only to help the reader to understand the present disclosure. Applicants have made no determination and make no assertion as to whether any of the above might be applicable as Prior Art with regard to the present application.

SUMMARY

To address the above-discussed deficiencies, it is a primary object to provide a method and system to add another level of authentication upon intercepting redirect end point to establish a correspondence between the packaged web application and the redirect end point.

Another object of the embodiments herein is to provide a method and system to determine a match between an intercepted redirect identifier and a pre-assigned redirect identifier associated with a client application stored at a web run time engine, such as to ensure that the redirect endpoint is not that of another application.

Embodiments herein provide a method for authenticating a client application attempting to access a protected resource stored on a resource server. The method includes receiving a request to access the protected resource at an authorization server; the request is received from the client application authorized by a resource owner of the protected resource. The method further includes redirecting the request to the resource server using a redirect identifier corresponding to a redirect endpoint of the client application. The redirect identifier is intercepted by a web runtime engine prior to the redirect. Furthermore, the method includes determining a match between the intercepted redirect identifier and a pre-assigned redirect identifier associated with the client application stored at the web runtime engine to authenticate the client application prior to providing access to the protected resource.

Embodiments herein provide a system for authenticating a client application attempting to access a protected resource stored on a resource server. The system comprising an authorization server configured to receive a request to access the protected resource. The request is received from the client application authorized by a resource owner of the protected resource. Further, the authentication server configured to redirect the request to the resource server using a redirect identifier corresponding to a redirect endpoint of the client application. A web runtime engine configured to intercept the redirect identifier prior to the redirect. Further, the web runtime engine configured to determine a match between the intercepted redirect identifier and a pre-assigned redirect identifier associated with the client application stored at the web runtime engine to authenticate the client application prior to providing access to the protected resource.

Embodiments herein provide a computer program product comprising a computer executable program code recorded on a computer readable non-transitory storage medium, the computer executable program code when executed causing the operations including receiving a request to access a protected resource stored at a resource server. The request is received from a client application authorized by a resource owner of the protected resource. The computer executable program code when executed causing further operations including redirecting the request to the resource server using a redirect identifier corresponding to a redirect endpoint of the client application. The redirect identifier is intercepted by a web run time engine prior to the redirect. The computer executable program code when executed causing further operations including determining a match between the intercepted redirect identifier and a pre-assigned redirect identifier associated with the client application stored at the web runtime engine to authenticate the client application prior to providing access to the protected resource.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications can be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
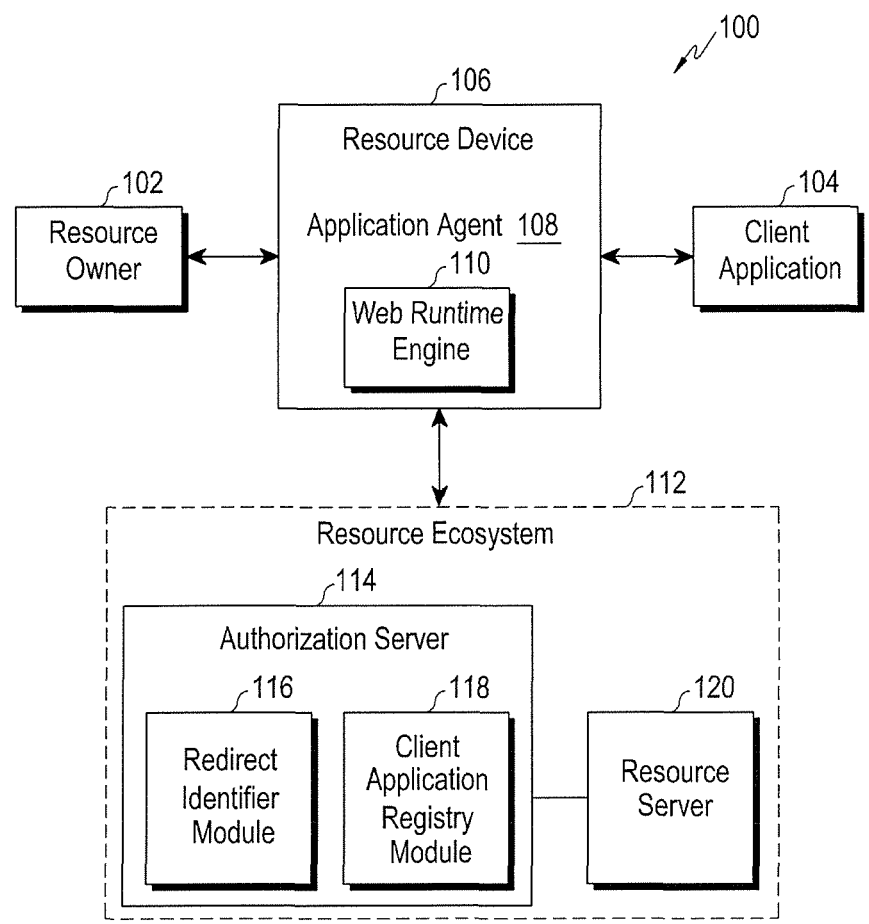
FIG. 1 illustrates a high level overview of a system for authenticating a client application attempting to access a protected resource stored on a resource server, according to embodiments as disclosed herein.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged security technologies. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein disclose a method and system for authenticating a client application attempting to access a protected resource stored on a resource server. The method includes receiving a request to access the protected resource at an authorization server. The request is received from the client application authorized by a resource owner of the protected resource. Further, the method includes redirecting the request to the resource server using a redirect identifier corresponding to a redirect endpoint of the client application, wherein the redirect identifier can be intercepted by a web runtime engine prior to the redirection. The redirect identifier is a configurable redirect identifier including a parameter allocated to the client application at the time of registration. The parameter described herein can include for example, but not limited to, an authority, a path, a Uniform Resource Identifier (URI), a query portion of the URI, a unique value, and the like. Further, the method includes determining a match between the intercepted redirect identifier and a pre-assigned redirect identifier associated with the client application stored at the web runtime engine to authenticate the client application prior to providing access to the protected resource.

The method and system described herein is simple and robust for authenticating the client applications, more particularly packaged web client applications, attempting to access the protected resource. An important aspect that differentiates the packaged web application from a normal web application is the scheme of the URIs of its resources. The scheme part of the URI for a normal web page can either be Hyper Text Transfer Protocol (HTTP) or HTTP Secure (HTTPS). Since the packaged web applications are installed on a device, and not fetched from any specific network location, the scheme part of the packaged web application is never http or https. Instead, the scheme part of the packaged web applications is set a proprietary value. Unlike conventional system, the web runtime engine can be used to add an additional level of security mechanism for the packaged web applications. During the time of redirect interception, the web runtime engine itself intercepts the redirect end point (HTTP 302 responses) and then applies a level of authentication on the intercepted "redirection URL" establishing a correspondence between the packaged web application and the redirect end point (HTTP URL) and ensures that the redirect end point is not that of the another application (web application, packaged web application or an application realized by any other means) and then inform back the result of the authentication to the client application.

For example, consider a scenario where a travel application such as "trip" (www.trip.com) is attempting to access data from the Social Networking Service-1 (SNS-1) application on user account to post travel events on the wall of the SNS-1 application. The travel application "trip" can request to access data from the SNS-1 application at the SNS-1 authorization server. The request of the travel application "trip" can be redirected to the SNS-1 application server using a redirect identifier corresponding to a redirect endpoint of the SNS-1 application. The redirect identifier will be intercepted by the web runtime engine prior to the redirect. The redirect identifier can be the URL allocated to the "trip" application at the time of registration or includes a parameter allocated to the "trip" application at the time of registration. The web runtime engine determines a match between the intercepted redirect identifier and the pre-assigned redirect identifier associated with the travel application "trip" stored at the web runtime engine to authenticate the travel application "trip" prior to providing access to the data from the SNS-1 application. If the match is determined, then the travel application "trip" is allowed to access the data from the SNS-1 application to post travel events on the wall of the SNS-1 application.

Unlike conventional systems, the possibility of session fixation type of attacks can be eliminated by providing an additional level of authentication mechanism for the client application attempting to access the protected resource stored in the resource server. A token-less mechanism is proposed to eliminate the risk of other applications (i.e. other than the client application attempting to access the protected resource) using the credentials and redirect end points of the client application to access the protected resource. Furthermore, the proposed method and system can be implemented using existing infrastructure and does not require extensive setup and instrumentation.

Referring now to the drawings, and more particularly to FIGS. 1 through 7, where similar reference characters denote corresponding features consistently throughout the figures, there are shown preferred embodiments.

FIG. 1 illustrates a high level overview of a system 100 for authenticating a client application attempting to access a protected resource stored on a resource server, according to embodiments as disclosed herein. In an embodiment, the system 100 can be configured to include a resource owner 102, a client application 104, a resource device 104, and a resource ecosystem 112.

In an embodiment, the resource owner 102 described herein can be an owner of the resources stored in the resource ecosystem 112. The resource device 106 described herein can be for example and not limited to a laptop, a desktop computer, a mobile phone, a smart phone, a Personal Digital Assistants (PDAs), a tablet, a phablet, a server, or any other electronic device. The resource owner 102 can use the resource device 106 to manage the content in the ecosystem 112. The resource device 106 includes an application agent 108 including a web runtime engine 110. The application agent 108 described herein can be for example and not limited to a browser application. The web runtime engine 110 described herein can be a part of the browser application or a separate web runtime system implemented as a part of the resource device 106. The web runtime engine 110 can include an authenticator or act as an authenticator itself to perform the additional level of security for the client application 104 attempting to access the protected resource. In an embodiment, the web runtime engine 110 can be any other non browser based entity but capable of using HTTP (specifically capable of intercepting HTTP 302 responses).

The client application described herein is a packaged web application typically hosted in the context of the resource ecosystem 112. The packaged web application is a web application but packaged in a specific format, and available to users for download. The package contains Hyper Text Markup Language (HTML) markups and other assets required for the applications to run. In packaged web applications, the HTML pages used by the applications reside in the resource device 106 instead of in a server. The packaged web applications run either over the application agent 108 (such as browser) or specialized run times provided by the web runtime engine 110, which are also known as "Web Run Times". By the definition the web runtime is not included as a part of the resource ecosystem 112, even though it is very closely associated with the resource ecosystem 112 and mostly designed specifically for the resource ecosystem 112.

Examples of the client application 104 can include, but not limited to, an email application, a social networking site (SNS) application, an Instant Messaging (IM) application, a third party application, a trusted application, and the like. The client application 104 can be configured to send an authorization request to the resource owner 102 to access or post content on behalf of the resource owner 102 in the resource ecosystem 112.

The client application 104 can send an authorization request to the web runtime engine 110 for accessing the protected resource stored in the resource ecosystem 112. The client application 104 can receive authorization grant to access the protected resource stored in the resource ecosystem 112 from the web runtime engine 110. Further, the web runtime engine 110 can send the request to the resource ecosystem 112 to authenticate the client application 104 and grant access to the protected resource.

In an embodiment, the resource ecosystem 112 includes an authorization server 114, and a resource server 120. The resource ecosystem 112 allows authorization server 114, and the resource server 120 to communicate with each other using a suitable means. The information being accessed is typically stored with another resource server 120. This access grant is provided as a result of the client application 104 initiating an authorization-flow. The authorization flow is initiated to an authorization-endpoint (also known as the authorization server 114 or a component of the resource server 120 that handles the authorization flow). Prior to the authorization-flow initiation the authorization server 114 mandates the client application 104 to register with itself.

The authorization server 114 includes a redirect identifier module 116 configured to register the client application 104. During the process of registration, a redirect identifier is pre-assigned to the client application 104. The pre-assigned redirect identifier is allocated to each client application during the registration of the client application 104 with the ecosystem 112, wherein each pre-assigned redirect identifier includes a parameter having for example but not limited to, an authority, a path, a Uniform Resource Identifier (URI), a query portion of the URI, a unique value, and the like.

The client application 104 uses these pre-assigned redirect identifier as its redirect endpoint(s) while registering with the authorization server 114. The web runtime engine 110 becomes aware of the pre-assigned redirect-endpoint(s) of the application and passes on redirect-endpoint(s) to the authenticator prior to redirect-endpoint interception moment. The web runtime engine 110 can be configured to store the redirect identifier received from the authorization server 114.

In an embodiment, the authorization server 114 includes a redirect identifier module 116 configured to generate and assign a redirect identifier to the client application 104. The redirect identifier is a configurable redirect identifier including a parameter allocated to the client application 104 at the time of registration. The parameter described herein can include for example, but not limited to, an authority, a path, the URI, a query portion of the URI, a unique value, and the like. During the time of redirect interception, the redirect identifier module 116 can be configured to allocate either a redirect identifier in real-time. The allocated redirect identifier can be the same as the pre-assigned redirect identifier allocated to the client application 104 at the time of registration or includes a pre-assigned parameter allocated to the client application 104 at the time of registration as a part of the redirect identifier.

Further, the authorization server 114 can be configured to redirect the request to the resource server 120 using the redirect identifier corresponding to a redirect endpoint of the client application 104. The web runtime engine 110 can be configured to intercept the redirect identifier prior to redirecting the client application 104 to access the protected resource stored in the resource server 120. The web runtime engine 110 can be configured to determine a match between the intercepted redirect identifier and the pre-assigned redirect identifier associated with the client application 104 stored at the web runtime engine 110 to authenticate the client application 104 prior to providing access to the protected resource.

Figure 2:
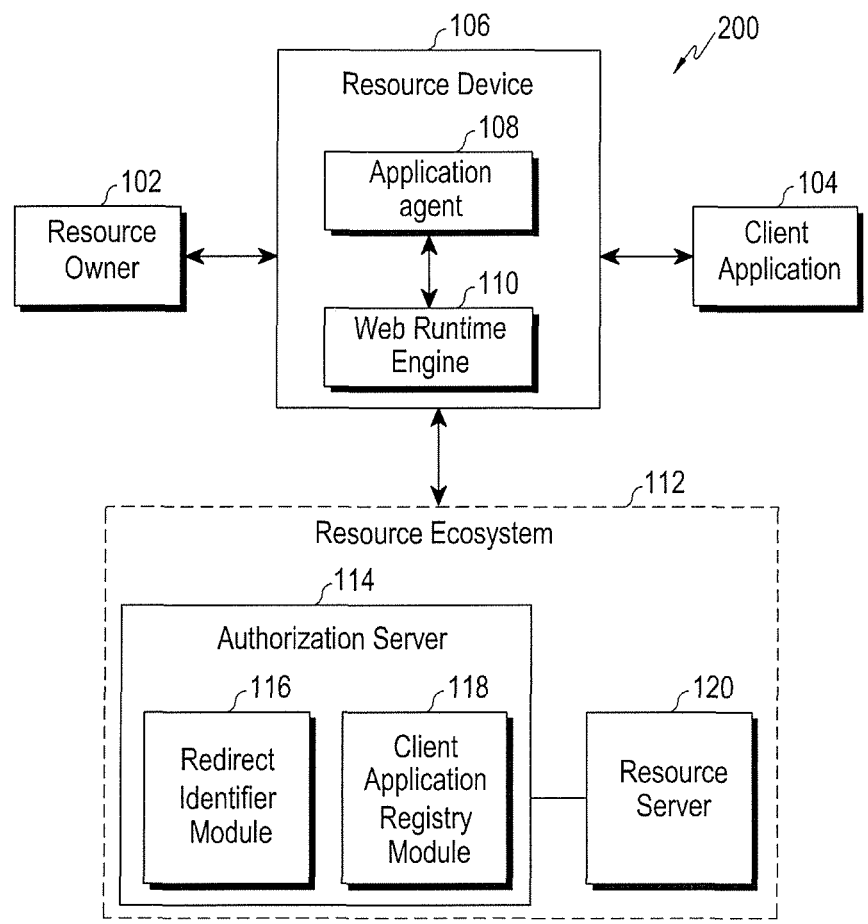
FIG. 2 illustrates another high level overview of a system, where a web runtime engine is implemented separately to authenticate the client application attempting to access the protected resource stored on the resource server, according to embodiments as disclosed herein.

FIG. 2 illustrates another high level overview of a system 200, where the web runtime engine 110 is implemented separately to authenticate the client application 104 attempting to access the protected resource stored on the resource server 120, according to embodiments as disclosed herein. In an embodiment, the web runtime engine 110 can be a separate entity connected to the application agent 108 residing on the resource device 106. The web runtime engine 110 can include an authenticator or act as an authenticator itself to perform the additional level of security for the client application 104 attempting to access the protected resource stored in the resource server 120.

FIGS. 1 and 2 shows a limited overview of the system but, it is to be understood that another embodiment is not limited thereto. Further, the system can include different modules communicating among each other along with other hardware or software components. For example, the component can be, but not limited to, a process running in the electronic device, an executable process, a thread of execution, a program, or a computer. By way of illustration, both an application running on an electronic device and the electronic device can be the component.

Figure 3:
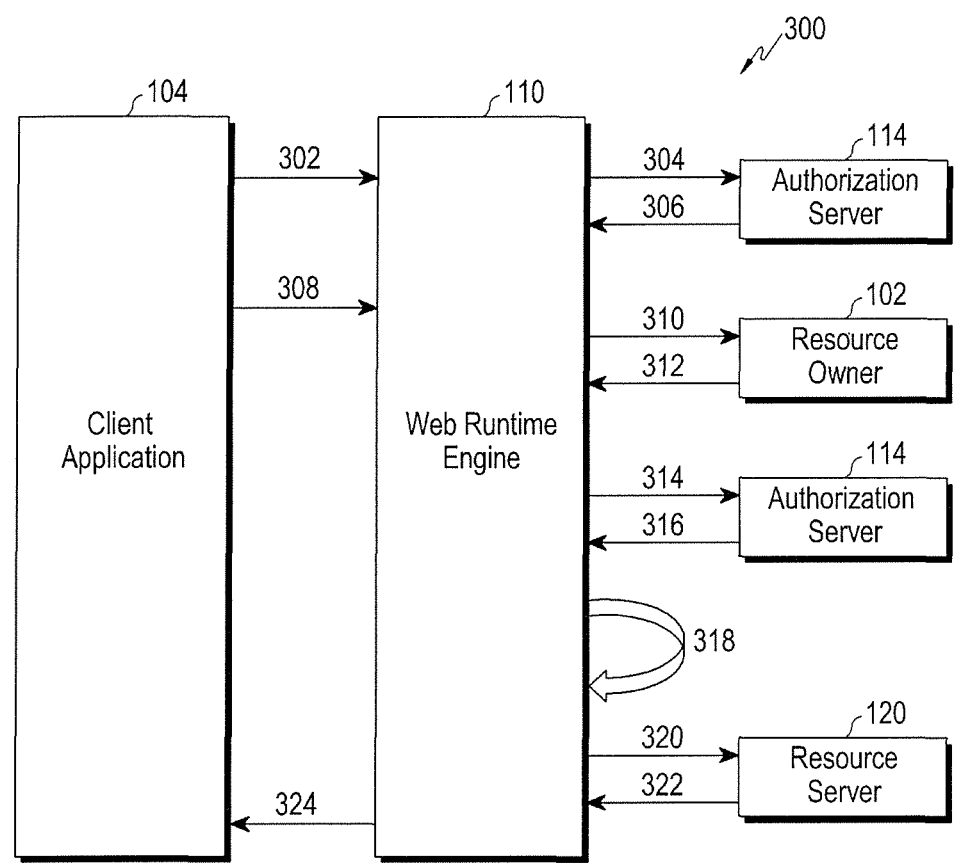
FIG. 3 is a sequence diagram illustrating various operations performed to authenticate the client application attempting to access the protected resource stored on the resource server, according to embodiments as disclosed herein.

FIG. 3 is a sequence diagram illustrating various operations 300 performed to authenticate the client application 104 attempting to access a protected resource stored on the resource server 120, according to embodiments as disclosed herein. Initially, the client application 104 can send (302) the authorization request to the web runtime engine 110 to register with the authorization server 114. The web runtime engine 110 sends (304) the request to authorization server 114 for registering the client application 104. During the process of registration, the authorization server 114 can be configured to pre-assign (306) a redirect identifier to the client application 104. The pre-assigned redirect identifier described herein can include a parameter having for example, but not limited to, an authority, a path, a Uniform Resource Identifier (URI), a query portion of the URI, a unique value, and the like. The pre-assigned redirect identifier is allocated to each client application 104 during the registration of the client application 104 with the ecosystem 112. The client application 104 uses these pre-assigned redirect identifier as its redirect endpoint(s) while registering with the authorization server 114. The web runtime engine 110 becomes aware of the pre-assigned redirect-endpoint(s) of the client application 104 and passes on the redirect-endpoint(s) to the authenticator prior to the redirect-endpoint interception moment.

Further, the client application 104 can send (308) the authentication request to access the protected resource stored in the resource server 120 to the web runtime engine 110. The web runtime engine 110 can send (310) the request received from the client application 104 to access the protected resource to the resource owner 102 to authenticate the client application 104. The resource owner 102 can send (312) authorization grant to the web runtime engine 110 upon authenticating the client application 104 to access the protected resource. Upon receiving the authorization grant from the resource owner 102, the web runtime engine 110 can send (314) the authorization request to the authorization server 114.

The authorization server 114 configured to assign (316) the redirect identifier to the client application 104. The parameter described herein can include for example, but not limited to, an authority, a path, the URI, a query portion of the URI, a unique value, and the like. Prior to the time of redirect interception, the redirect identifier module 116 can be configured to allocate either a redirect identifier in real-time. The allocated redirect identifier can be the same as the pre-assigned redirect identifier allocated to the client application 104 at the time of registration or includes a pre-assigned parameter allocated to the client application 104 at the time of registration as a part of the redirect identifier. The authorization server 114 can be configured to send the assigned redirect identifier to the web runtime engine 110.

Further, the web runtime engine 110 can be configured to intercept (318) the redirect identifier prior to redirecting the client application 104 to the resource server 120. The web runtime engine 110 can be configured to determine (318) a match between the intercepted redirect identifier and a pre-assigned redirect identifier associated with the client application 104 stored at the web runtime engine 110 to authenticate the client application 104 prior to providing access to the protected resource. In an embodiment, during the time of redirect interception, the web runtime engine 110 can itself intercept the redirect end point (HTTP 302 responses). The web runtime engine 110 can be configured to pass the intercepted redirect identifier to another trusted application for the job of authentication. A level of authentication is then applied on the intercepted "redirection URL" establishing a correspondence between the packaged web application and the redirect end point (HTTP URL) and ensure that the redirect end point is not that of the another application (web application, packaged web application or an application realized by any other means). In another embodiment.

Furthermore, the web runtime engine 110 can be configured to grant (324) permission for the client application 104 to access the protected resource in response to determining the match between the redirect identifier and the pre-assigned redirect identifier.

Figure 4A:
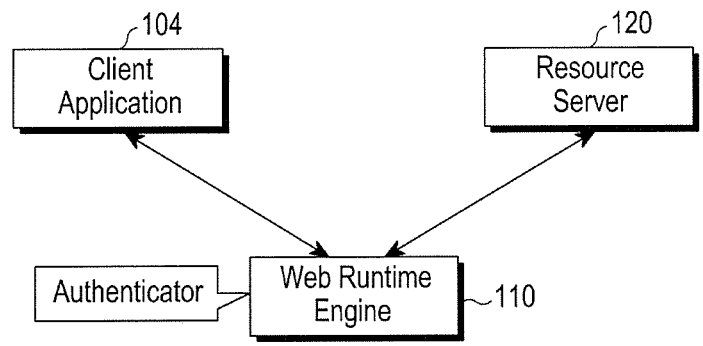
FIGS. 4a and 4b illustrate operations of a runtime engine configured to apply an additional level of security mechanism to authenticate the client application attempting to access the protected resource, according to embodiments as disclosed herein.
Figure 4B:
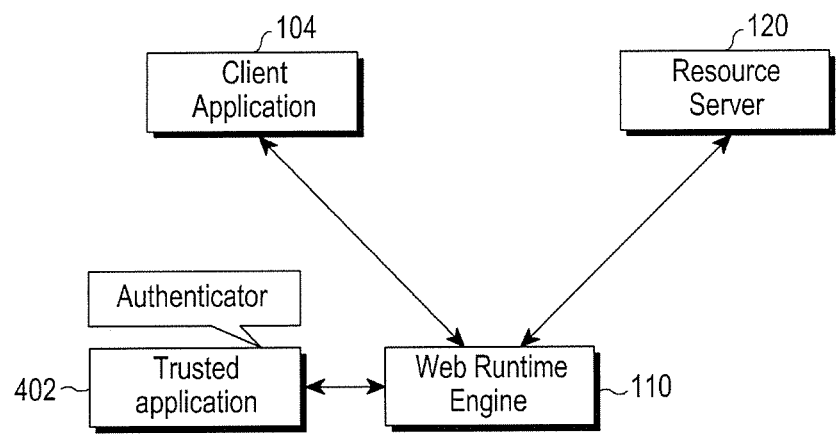

FIGS. 4a-4b illustrates operations of the runtime engine 110 configured to apply an additional level of security mechanism to authenticate the client application 104 attempting to access the protected resource, according to embodiments as disclosed herein. In an embodiment, the web runtime engine 110 can act as an authenticator itself to perform the additional level of security for the client application 104 attempting to access the protected resource as shown in the FIG. 4a. The web runtime engine 110 can be configured to intercept the redirect end point assigned by the authorization server 114 to perform the additional level of authentication on the intercepted redirect identifier; thereby, establishing a correspondence between the client application 104 and the redirect end point and inform back the result of the authentication to the client application 104 as shown in the FIG. 4a.

In an embodiment, the web runtime engine 110 can be configured to pass the intercepted redirect identifier to a trusted application 402 for performing the additional level of authentication as shown in the FIG. 4b. The trusted application handles the authentication activity delegated by web runtime engine 110. In an example, the trusted application 402 can be a third party application. The trusted application 402 can establish a correspondence between the client application 104 and the redirect end point to ensure that the redirect endpoint is not that of another application and then inform back the result of the authentication to the web runtime engine 110 or the client application 104 or both. In an embodiment, the client application 104 can have one or more redirect-endpoints. The web runtime engine 110 can be configured to establish the correspondence between the client application 104 and the redirect end point in multiple ways.

In an embodiment, the web runtime engine 110 can establish the correspondence between the client application 104 and the redirect endpoint. The resource ecosystem 112 can be configured to generate and assign one or more unique URIs (including an authority, a path and query parts of the URI) for the client application 104 during the time of initial registration of the client application 104 with the resource ecosystem 112. The client application 104 can use the assigned one or more URIs as redirect endpoints while registering with the authorization server 114. The web runtime engine 114 can receive the pre-assigned redirect endpoints of the client application 104 from the resource ecosystem 112 and sends the pre-assigned redirect endpoints to the web runtime engine 110 prior to redirect endpoint interception by the web runtime engine 110. The web runtime engine 110 can be configured to store the pre-assigned redirect identifier received from the authorization server 114. During the time of redirect interception, the web runtime engine 110 can be configured to match the intercepted redirect identifier with the pre-assigned redirect endpoints. The web runtime engine 110 can be configured to declare the authentication as successful if the intercepted redirect identifier matches with the pre-assigned redirect endpoints of the client application 104.

The web runtime engine 110 can be aware of the pre-assigned redirect endpoints of the client application 104. In an embodiment, the set of pre-assigned redirect identifiers are coded into the configuration document of the client application 104. The configuration document can be transmitted to the resource device 120 during the time of application download. The web runtime engine 110 can be configured to extract the pre-assigned redirect endpoints from the configuration document. In another embodiment, the set of pre-assigned redirect identifiers are coded into a separate file. The file in which the pre-assigned redirect identifiers are coded can be made part of the client application 104. Upon installing the client application 104, the web runtime engine 110 can extract the pre-assigned redirect endpoints from the file.

In another embodiment, the web runtime engine 110 can establish the correspondence between the client application 104 and the redirect endpoint wherein the resource ecosystem 112 can be configured to assign the unique URIs (including an authority, a path and query parts of the URI) for the client application 104. In an embodiment, the pre-assigned URI can be, for example, but not limited to, the identifier of an author of the application represented in the form of the URI, the identifier of the application represented in the form of the URI. The client application 104 can use the pre-assigned URI as its redirect endpoint while registering with the authorization server 114. The web runtime engine 110 can be configured store the pre-assigned redirect endpoint of the client application 104 prior to redirect endpoint interception. During the time of redirect interception, the web runtime engine 110 can be configured to match the intercepted redirect identifier with the assigned redirect-endpoint. The web runtime engine 110 can be configured to declare the authentication to be successful if the intercepted redirect identifier matches with the pre-assigned redirect endpoint of the client application 104.

In another embodiment, the web runtime engine 110 can establish the correspondence between the client application 104 and the redirect endpoint wherein the resource ecosystem 112 can be configured to provide the freedom to the client application 104 to define the authority, path, and parameter components associated with the redirect endpoint. The client application 104 can define one or more redirect endpoints. The resource ecosystem 112 can introduce an additional parameter-value pair and can assign to all application defined redirect endpoints. The same parameter value string is assigned to all redirect endpoints for the client application 104. In an embodiment, the resource ecosystem 112 can assign the parameter-value pair where the parameter can be a fixed string or a randomly generated string. The value of the parameter is auto-generated and it is either a numeric value or a string. The value of the parameter is auto-generated such that the parameter-value pair is unique across the applications in the resource ecosystem 112 but same across the resource device 106 for the client application 104. The parameter value pairs are coded into the packaging configuration document or the separate file that is part of the package.

In another embodiment, the resource ecosystem 112 can assign the parameter-value pair where the parameter can be a fixed string. The value of the parameter assigned shall be an identifier with which an application can be uniquely identified from within the web runtime engine 110. The unique redirect identifier should be extracted during application runtime by the web runtime engine 110. For example, the unique identifier can be of any value. The unique identifier can be the application identifier represented in the form of the numeric value or a non-URI string.

The client application 104 can be configured to register each of the application-defined URIs suffixed with the assigned parameter value pair to the query component of the URI as its redirect endpoints while registering with the authorization server 114. The assigned parameter-value pair is used by the web runtime engine 110 to ensure that the redirect endpoint being used is not that of another application. The web runtime engine 110 can be aware of the assigned parameter-value pair prior to redirect endpoint interception moment. During the time of redirect interception, the web runtime engine 110 can perform the match procedure for the intercepted URI with the assigned parameter-value pair by:

Extracting the parameter-value pair from the intercepted URI

Match the extracted parameter-value pair with the assigned parameter-value pair

Match is successful, If the extracted parameter-value pair exactly/partially matches with assigned parameter value pair Match is failure, if parameter-value pair is non-existent in the intercepted URI.

Further, the web runtime engine 110 can be configured to declare the authentication to be successful if the match between the intercepted URI and the assigned parameter-value pair is determined. The web runtime engine 110 can be aware of the assigned parameter-value pair for the client application 104 where the parameter can be a fixed string or an auto-generated string and the value of the parameter is either numeric value or a string auto-generated by the resource ecosystem 112. The parameter value pair can be coded into the configuration document of the packaged web application. The configuration document can be transmitted to the resource device 106 during the time of application download. And, the web runtime engine 110 can extract the assigned parameter-value pair from the configuration document. In another embodiment, of the web runtime engine 110 can be aware of the assigned parameter-value pair for the client application 110 where the parameter can be a fixed string or an auto-generated string and the value of the parameter is either numeric value or a string generated by the resource ecosystem 112, the parameter-value pair is coded into a separate file. The file in which the assigned parameter value is coded can be made part of the package. Upon package installation, the web runtime engine 110 can extract the assigned redirect endpoints from the file. In another embodiment, the parameter can be a fixed string and the value of the parameter is assigned a unique identifier that can be extracted during the application runtime, the parameter-value pair for the client application 104 is synthetically created locally using the secure APIs provided by the web runtime engine 110. In this case, parameter-value pair is never transmitted explicitly to the device where application is installed. In an embodiment, one application can have multiple redirect end points (HTTP URIs).

Figure 5:
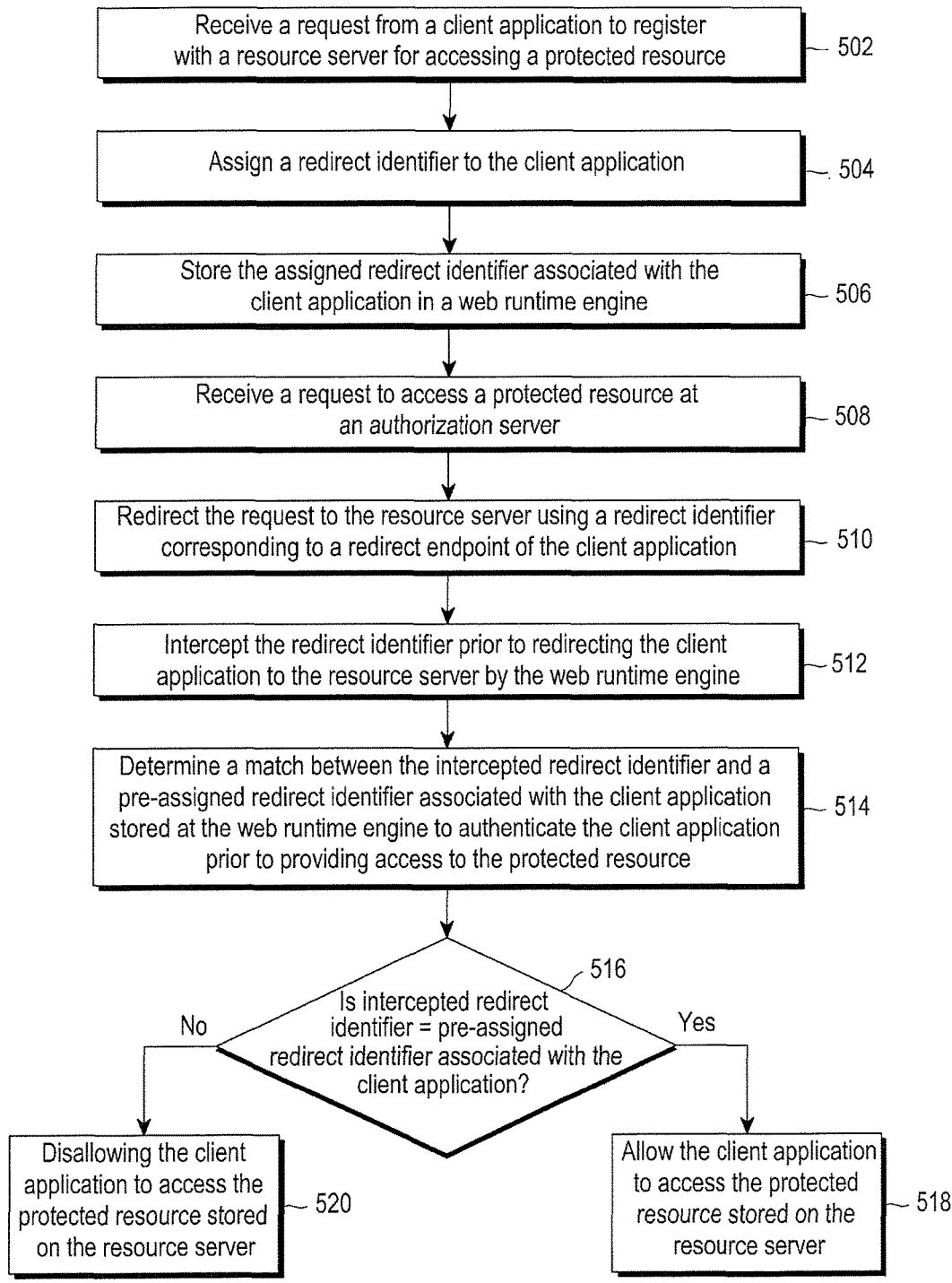
FIG. 5 is a flow diagram illustrating a method for authenticating a client application attempting to access a protected resource, according to embodiments as disclosed herein.

FIG. 5 is a flow diagram illustrating a method 500 for authenticating a client application attempting to access a protected resource stored on a resource server 120, according to embodiments as disclosed herein. At step 502, the method 500 includes receiving a request from a client application 104 to register initially with authorization server 114 for accessing a protected resource on the resource server 120. The method 500 allows authorization server 114 to receive the request from the client application 104 to register initially with the authorization server 114 for accessing the protected resource. For example, consider a photo editing application attempting to access a protected resource stored in the SNS-2 application server. The photo editing application can initiate an authorization flow by sending a request to the web runtime engine 110. The web runtime engine 110 can invoke user consent orchestration in order to ask user of the SNS-2 application to verify that the photo editing application should be granted access to the data from the SNS-2 application. The user consent orchestration indicates the user of the SNS-2 application, the scope to which the photo editing application attempting to access the data and provide the user with the opportunity to consent or decline the access of the photo editing application to the data stored in the SNS-2 application server. At step 504, the method 500 includes assigning a redirect identifier to the client application 104. The method 500 allows the redirect identifier module 116 to assign the redirect identifier to the client application 104. In an embodiment, the redirect identifier includes a parameter having one of an authority, a path, a uniform resource identifier (URI), query portion of the URI and unique value. In another embodiment, the redirect identifier is a configurable redirect identifier. The parameter can be configured in the web runtime engine 110 by the client application 104 or the authentication server 114. For example, the photo editing application will be assigned with the redirect identifier by the redirect identifier module 116 in the authorization server 114 of the SNS-2 application.

At step 506, the method 500 includes storing the assigned redirect identifier associated with the client application 104 in a web runtime engine 110. The method 500 allows the web runtime engine 110 to store the assigned redirect identifier associated with the client application 104. For example, the assigned redirect identifier of the photo editing application will be stored in the web runtime engine 110. At step 508, the method 500 includes receiving another request to access a protected resource at the authorization server 114. The method 500 allows the authorization server 114 to receive the request to access the protected resource on the resource server 120. At step 510, the method 500 includes redirecting the request to the resource server 120 using the redirect identifier corresponding to a redirect endpoint of the client application 104. The method 500 allows the authorization server 114 to redirect the request to the resource server 120 using the redirect identifier corresponding to the redirect endpoint of the client application 104. At step 512, the method 500 includes intercepting the redirect identifier prior to redirecting the client application 104 to the resource server 120 by the web runtime engine 110. The method 500 allows the web runtime engine 110 to intercept the redirect identifier prior to redirecting the client application 104 to the resource server 120. For example, the web runtime engine 110 can intercept the redirect identifier prior to redirecting the photo editing application to access the data stored in the SNS-2 application server.

At step 514, the method 500 includes determining a match between the intercepted redirect identifier and a pre-assigned redirect identifier associated with the client application 104 stored at the web runtime engine 110 to authenticate the client application 104 prior to providing access to the protected resource. The method 500 allows the web runtime engine 110 to determine the match between the intercepted redirect identifier and the pre-assigned redirect identifier associated with the client application 104 to authenticate the client application 104 prior to providing access to the protected resource. In an embodiment, the pre-assigned redirect identifier can be allocated to the client application 104 during initial registration of the client application 104 with the authorization server 114. The pre-assigned redirect identifier described herein can include for example, but not limited to, an authority, a path, a Uniform Resource Identifier (URI), a query portion of the URI, a unique value, and the like. For example, the web runtime engine 110 can determine whether the intercepted redirect identifier of the photo editing application matches with the pre-assigned redirect identifier which is already stored in the web runtime engine 110. If it is determined that at the step 514, that the intercepted redirected identifier and the pre-assigned redirect identifier is detected to be same then, at step 518, the method 500 includes allowing the client application 104 to access the protected resource stored on the resource server 120. The method allows the web runtime engine 110 to allow the client application 104 to access the protected resource on the resource server 120. If it is determined that at the step 514, that the intercepted redirected identifier and the pre-assigned redirected identifier is detected to be not same then at step 520, the method 500 includes disallowing the client application 104 to access the protected resource stored on the resource server 120. For example, if the redirect identifier of the photo editing application matches with the pre-assigned redirect identifier then the photo editing application will be allowed to access the data stored on the SNS-2 application server. Unlike conventional systems, the possibility of session fixation type of attacks can be eliminated by providing an additional level of authentication mechanism for the client application attempting to access the protected resource stored on the resource server. Unlike conventional systems, token less mechanism can be provided; thereby, eliminating the risk of other applications (i.e. other than the client application attempting to access the protected resource) using the credentials and redirect end points of the client application to access the protected resource.

The various actions, acts, blocks, steps, and the like in method 500 can be performed in the order presented, in a different order or simultaneously. Further, in some embodiments, some actions, acts, blocks, steps, and the like can be omitted, added, modified, skipped, and the like without departing from the scope of the disclosure.

Figure 6:
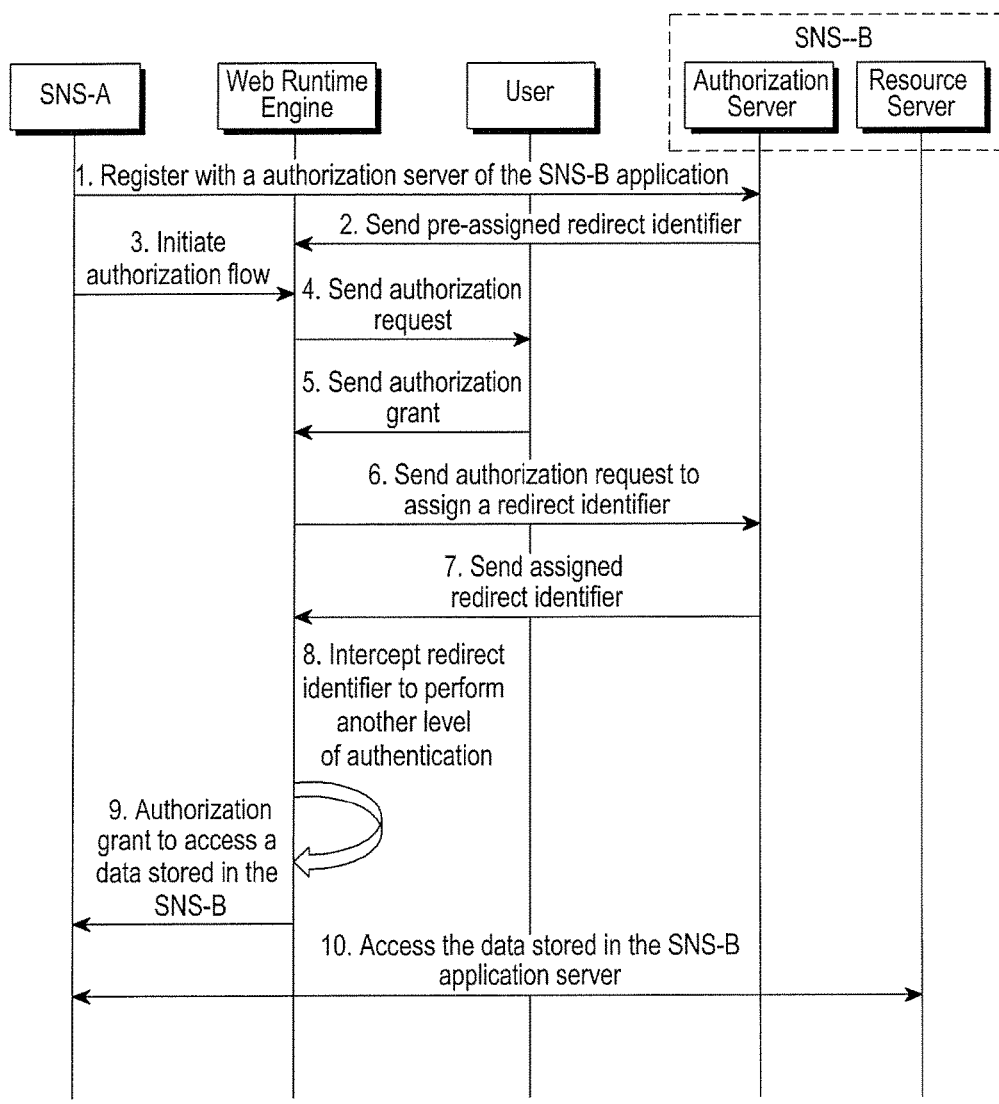
FIG. 6 shows an example illustration for registering and authenticating a SNS application attempting to access a protected resource stored on a resource server, according to embodiments as disclosed herein.

FIG. 6 shows an example illustration for registering and authenticating a SNS-A application attempting to access a protected resource stored on a SNS-B application server, according to embodiments as disclosed herein. The sequence of steps followed by the SNS-A application to access the data stored on the SNS-B application server are explained below:

Step-1: Initially, the SNS-A application registers with the authorization server of the SNS-B application. Here, a request is sent by the SNS-A application for registering with the authorization server. Upon receiving the request, the authorization server can assign a redirect identifier to the SNS-A application.

Step-2: Authorization server can send the pre-assigned redirect identifier to the web runtime engine. Here, the authorization server can send the pre-assigned redirect identifier to store in the web runtime engine.

Step-3: Initiating an authorization flow by the SNS-A application on sending the request to the web runtime engine for accessing the data stored on the SNS-B application server.

Step-4: Web runtime engine sends the authorization request to the user of the SNS-B application. Upon receiving the authorization flow request from the SNS-A application, the web runtime engine can send the authorization request to the user of the SNS-B application.

Step-5: Send the authorization grant response to the web runtime engine. Here, the web runtime engine can invoke the user consent orchestration in order to ask the user of the SNS-B application to verify that the SNS-A application should be granted access to the data stored on the SNS-B application server. The user consent orchestration indicates the user, the data to which the SNS-A application is seeking access, and provides the user with the opportunity to consent or decline access of the SNS-Application to the data.

Step-6: Send the authorization request to assign the redirect identifier. Here, the web runtime engine can send the authorization request to the authorization server of the SNS-B application for assigning the redirect identifier to the SNS-A application attempting to access the data stored on the SNS-B application server. Further, the authorization server can assign the redirect identifier to the SNS-A application.

Step-7: The authorization server sends the assigned redirect identifier to the web runtime engine.

Step-8: The Web runtime engine intercepts the redirect identifier to perform additional level of authentication. Here, the web runtime engine can intercept the redirect identifier prior to redirecting the SNS-A application to the SNS-B application server. Further, the web runtime engine can determine the match between the intercepted redirect identifier and the pre-assigned redirect identifier associated with the SNS-A application stored at the web runtime engine to authenticate the SNS-A application prior to providing access to the data.

Step-9: Web runtime engine sends authorization grant to the SNS-A application to access the data stored on the SNS-B application server. If the web runtime engine determines that the intercepted identifier and the pre-assigned redirect identifier is detected to be same then the authorization grant is sent to the SNS-A application to access the data.

Step-10: Access the data stored on the SNS-A application server. Upon receiving the authorization grant, the SNS-A application will access the data stored on the SNS-B application server.

Figure 7:
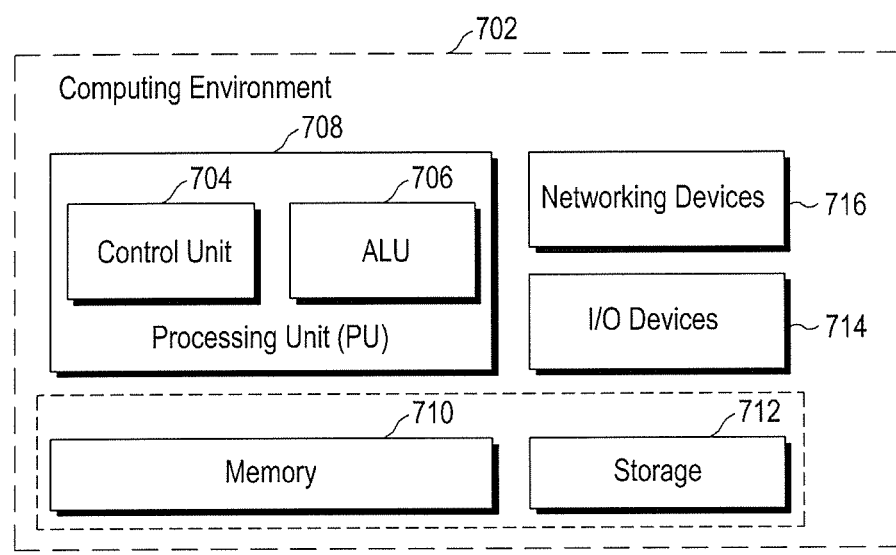
FIG. 7 illustrates a computing environment implementing the method and system for authenticating a client application attempting to access the protected resource stored on the resource server, according to embodiments as disclosed herein.

FIG. 7 illustrates a computing environment implementing the method and system for authenticating a client application attempting to access a protected resource stored on a resource server, according to embodiments as disclosed herein. As depicted in the figure, the computing environment 702 comprises at least one processing unit 708 that is equipped with a control unit 704 and an Arithmetic Logic Unit (ALU) 706, a memory 710, a storage unit 712, plurality of networking devices 716 and a plurality Input output (I/O) devices 714. The processing unit 708 is responsible for processing the instructions of the algorithm. The processing unit 708 receives commands from the control unit in order to perform its processing. Further, any logical and arithmetic operations involved in the execution of the instructions are computed with the help of the ALU 706.

The overall computing environment 702 can be composed of multiple homogeneous and/or heterogeneous cores, multiple CPUs of different kinds, special media and other accelerators. The processing unit 708 is responsible for processing the instructions of the algorithm. Further, the plurality of processing units 708 can be located on a single chip or over multiple chips.

The algorithm comprising of instructions and codes required for the implementation are stored in either the memory unit 710 or the storage 712 or both. At the time of execution, the instructions can be fetched from the corresponding memory 710 and/or storage 712, and executed by the processing unit 708.

In case of any hardware implementations various networking devices 716 or external I/O devices 714 can be connected to the computing environment to support the implementation through the networking unit and the I/O device unit.

The embodiments disclosed herein can be implemented through at least one software program running on at least one hardware device and performing network management functions to control the elements. The elements shown in FIGS. 1, 2, 3*a*-3*b*, 4*a*-4*b*, 6 and 7 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for authenticating an application by an authorization server, the method comprising:
   receiving, by the authorization server related to a first application, from a web runtime engine in a device, a registration request to register a second application with the authorization server for accessing a protected resource stored in a resource server of the first application;
   transmitting, by the authorization server, a first redirect uniform resource identifier (URI) including a first parameter-value pair assigned to the second application to the web runtime engine, in response to the registration request, the first redirect URI being stored in the web runtime engine;
   receiving, by the authorization server, an access request to access the protected resource by the second application from the web runtime engine; and
   transmitting, by the authorization server, the access request to the resource server using a second redirect URI corresponding to a redirect endpoint of the second application,
   wherein the second redirect URI is intercepted by the web runtime engine before the access request is transmitted from the authorization server to the resource server,
   wherein a second parameter-value pair included in the intercepted second redirect URI is compared by the web runtime engine to the first parameter-value pair included in the first redirect URI stored in the web runtime engine, and the web runtime engine is configured to transmit, to the second application, an access grant to grant an access to the protected resource in response to the access request based on a comparison result that the second parameter-value pair matches the first parameter-value pair, and
   wherein all redirect endpoints of the second application include the first parameter-value pair.

2. The method of claim 1, wherein the protected resource is accessed by the second application based on the access grant.

3. The method of claim 1, wherein the access request is transmitted to the resource server by the web runtime engine based on the comparison result that the second parameter-value pair matches the first parameter-value pair.

4. An authorization server, the authorization server comprising:
   a transceiver; and
   a processor configured to control the transceiver to:
   receive, from a web runtime engine in a device, a registration request to register a second application with the authorization server related to a first application for accessing a protected resource stored in a resource server of the first application;
   transmit a first redirect uniform resource identifier (URI) including a first parameter-value pair assigned to the second application to the web runtime engine, in response to the registration request, the first redirect URI being stored in the web runtime engine;
   receive an access request to access the protected resource by the second application, the protected resource including data generated by the first application; and
   transmit the access request to the resource server using a second redirect URI corresponding to a redirect endpoint of the second application,
   wherein the second redirect URI is intercepted by the web runtime engine before the access request is transmitted from the authorization server to the resource server,
   wherein a second parameter-value pair included in the intercepted second redirect URI is compared by the web runtime engine to the first parameter-value pair included in the first redirect URI stored in the web runtime engine, and the web runtime engine is configured to provide an access grant to access the protected resource to the second application based on a comparison result that the second parameter-value pair matches the first parameter-value pair, and
   wherein all redirect endpoints of the second application include the first parameter-value pair.

5. The authorization server of claim 4, wherein the protected resource is accessed by the second application based on the access grant.

6. The authorization server of claim 4, wherein the access request is transmitted to the resource server by the web runtime engine based on the comparison result that the second parameter-value pair matches the first parameter-value pair.

7. A method for authenticating an application by a web runtime engine in a device, the method comprising:
transmitting, by the web runtime engine, to an authorization server related to a first application, a registration request to register a second application with the authorization server for accessing a protected resource stored in a resource server of the first application;
receiving, by the web runtime engine, a first redirect uniform resource identifier (URI) including a first parameter-value pair assigned to the second application from the authorization server related to the first application, and storing the first redirect URI in response to transmitting a registration request to register the second application with the authorization server for accessing the protected resource stored in the resource server of the first application;
receive, by the web runtime engine, the registration request to register a second application with the authorization server related to the first application for accessing the protected resource stored in a resource server of the first application;
transmitting, by the web runtime engine, to the authorization server an access request;
intercepting, by the web runtime engine, a second redirect URI from the access request, before the access request is transmitted to the resource server from the authorization server;
comparing, by the web runtime engine, the first parameter-value pair included in the stored first redirect URI and a second parameter-value pair included in the intercepted second redirect URI; and
transmitting, by the web runtime engine, an access grant to grant an access to the protected resource to the second application based on a comparison result that the second parameter-value pair matches the first parameter-value pair,
wherein all redirect endpoints of the second application include the first parameter-value pair.

8. The method of claim 7, wherein the access to the protected resource by the second application is allowed based on the access grant.

9. The method of claim 7, wherein the access request is transmitted to the resource server by the web runtime engine based on the comparison result that the second parameter-value pair matches the first parameter-value pair.

10. A web runtime engine in a device, the web runtime engine comprising:
a transceiver;
a memory; and
a processor configured to control the transceiver to:
transmit, to an authorization server related to a first application, a registration request to register a second application with the authorization server for accessing a protected resource stored in a resource server of the first application,
receive a first redirect uniform resource identifier (URI) including a first parameter-value pair assigned to the second application from the authorization server related to the first application, and store the first redirect URI at the memory, in response to transmitting the registration request to register the second application with the authorization server for accessing the protected resource stored in the resource server of the first application,
receive an access request to access the protected resource from the second application,
transmit, to the authorization server, the access request to access the protected resource,
intercept a second redirect URIL, from the access request, before the access request is transmitted to the resource server from the authorization server,
compare the first parameter-value pair included in the stored first redirect URI and a second parameter-value pair included in the intercepted second redirect URI and
transmit an access grant to grant an access to the protected resource to the second application based on a comparison result that the second parameter-value pair matches the first parameter-value pair,
wherein all redirect endpoints of the second application include the first parameter-value pair.

11. The web runtime engine of claim 10, wherein the access to the protected resource by the second application is allowed based on the access grant.

12. The web runtime engine of claim 10, wherein the access request is transmitted to the resource server by the web runtime engine based on the comparison result that the second parameter-value pair matches the first parameter-value pair.

13. The method of claim 1, wherein the first parameter-value pair includes one of a fixed string and a randomly generated string, and
wherein the first parameter-value pair is different from a third parameter-value pair included in all redirect endpoints of a third application, the third application being different from the first application.

14. The authorization server of claim 4, wherein the first parameter-value pair includes one of a fixed string and a randomly generated string, and
wherein the first parameter-value pair is different from a third parameter-value pair included in all redirect endpoints of a third application, the third application being different from the first application.

15. The method of claim 7, wherein the first parameter-value pair includes one of a fixed string and a randomly generated string, and
wherein the first parameter-value pair is different from a third parameter-value pair included in all redirect endpoints of a third application, the third application being different from the first application.

16. The web runtime engine of claim 10, wherein the first parameter-value pair includes one of a fixed string and a randomly generated string, and
wherein the first parameter-value pair is different from a third parameter-value pair included in all redirect endpoints of a third application, the third application being different from the first application.

\* \* \* \* \*